United States Patent [19]

Jenkins

[11] 4,406,863

[45] Sep. 27, 1983

[54] INTEGRATED SOLID PROPELLANT GAS GENERATOR AND FLUID HEAT EXCHANGER

[75] Inventor: Donald S. Jenkins, Tarzana, Calif.

[73] Assignee: The United States of America as represented by the Secretary of the Air Force, Washington, D.C.

[21] Appl. No.: 347,381

[22] Filed: Feb. 9, 1982

[51] Int. Cl.³ ............................................. F28D 21/00
[52] U.S. Cl. ................................... 422/205; 60/251; 60/256; 102/530; 165/104.17; 165/104.21; 422/202
[58] Field of Search ............... 422/165, 198, 202, 204, 422/205, 113, 193, 167, 305; 60/206, 250, 251, 255, 256, 671; 165/104.17, 104.21; 102/530; 48/61

[56] References Cited

U.S. PATENT DOCUMENTS

| | | | |
|---|---|---|---|
| 2,779,281 | 1/1957 | Maurice et al. | 102/530 |
| 2,816,419 | 12/1957 | Mueller | 60/671 |
| 2,972,225 | 2/1961 | Cumming et al. | 60/250 |
| 2,989,381 | 6/1961 | Musser | 422/305 |
| 3,034,289 | 5/1962 | Stott et al. | 60/251 |
| 3,128,599 | 4/1964 | Carr | 60/251 X |
| 3,144,751 | 8/1964 | Blackman, Jr. et al. | 60/251 X |
| 3,300,978 | 1/1967 | Pennington | 60/251 X |
| 3,305,319 | 2/1967 | Kowalick et al. | 422/193 |
| 3,458,288 | 7/1969 | Lafyatis et al. | 422/113 |
| 3,483,703 | 12/1969 | Hutter | 60/255 |
| 3,558,285 | 1/1971 | Ciccone et al. | 422/165 |
| 3,646,597 | 2/1972 | Feemster | 60/251 |
| 3,719,046 | 3/1973 | Sutherland et al. | 60/206 |
| 3,733,180 | 5/1973 | Heineck et al. | 422/167 |

Primary Examiner—Richard L. Chiesa
Attorney, Agent, or Firm—Donald J. Singer; Jacob N. Erlich

[57] ABSTRACT

A gas generator which is structurally and functionally integrated with a fluid heat exchanger. A liquid which is to be heated, vaporized, and used as pressurized gas is introduced into the integrated apparatus where the liquid absorbs heat from the adjacent, but separated, hot gas flow from the gas generator. Unlike the prior art, this integrated gas generator/fluid heat exchanger is useable to pressurize an oxidizer tank of a liquid engine missile.

5 Claims, 2 Drawing Figures

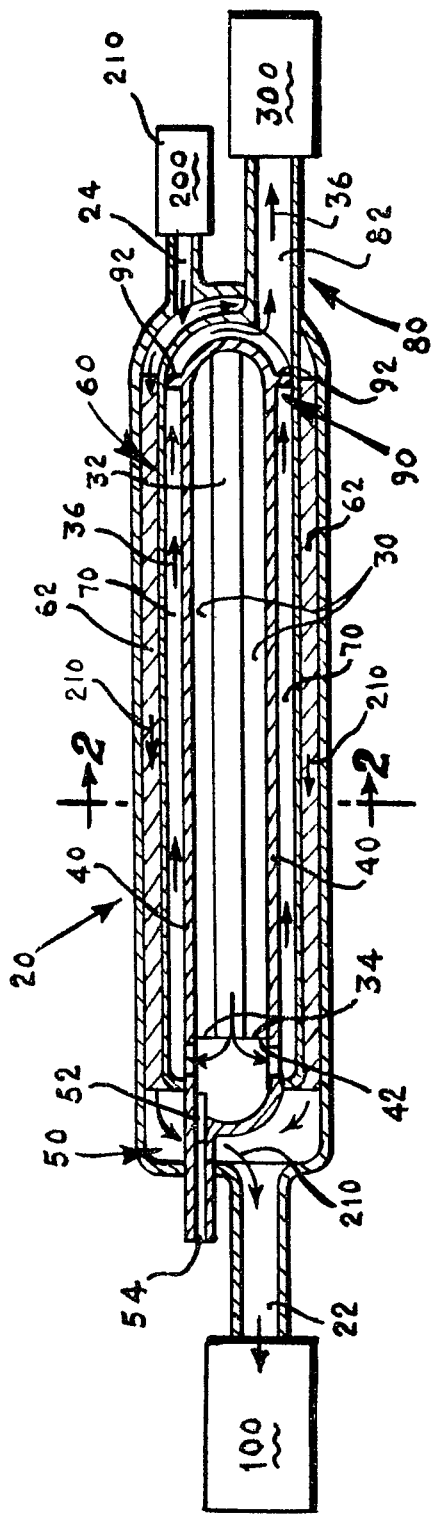
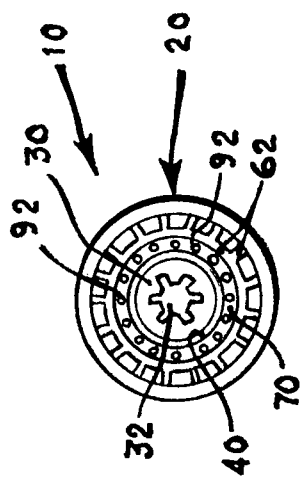

INTEGRATED SOLID PROPELLANT GAS GENERATOR AND FLUID HEAT EXCHANGER

STATEMENT OF GOVERNMENT INTEREST

The invention described herein may be manufactured and used by or for the Government for governmental purposes without the payment of any royalty thereon.

BACKGROUND OF THE INVENTION

This invention relates to a heat exchanger, and more particularly to an integrated solid propellant gas source (i.e., gas generator) and fluid heat exchanger.

There are many situations where a heated fluid is needed quickly from a remote source of unheated fluid. One of these situations is with regard to prepacked liquid engine missiles, where pressurized gas is needed to pressurize oxidizer tanks. Unfortunately, prior art solid propellant gas generators are not able to pressurize oxidizer tanks, because of the reaction between the oxidizer and the gas generated by the solid propellant.

Prior to the advent of the instant invention no direct means was available to overcome this problem. Specifically with regard to the prepackaged liquid engine missiles, the options that were available were: (a) an independent pressurizing source, such as a nitrogen tank, completely separated from the fuel rich gases; or (b) the introduction of an interface protective barrier (i.e., a bladder) that separates the liquid from the pressurized gas.

SUMMARY OF THE INVENTION

The instant invention eliminates the aforesaid prior art problem. It does so by producing large amounts of gas under pressure during a comparatively short time, and by structuring the solid propellant gas generating source such that this gas generating source is also, in fact, a fluid heat exchanger. In other words, the solid propellant gas generator and the fluid heat exchanger are integrated. Then, by structurally forcing a liquid oxidizer (hereinafter referred to as a liquid propellant) through the integrated device, the liquid propellant is heated and is vaporized by absorbing the heat from the hot gas flow which is generated by the burning of the solid propellant. Then, the vaporized liquid propellant exits (i.e., is ducted) as pressurized gas and is ducted to where it is needed.

Accordingly, it is an object of the instant invention to provide an integrated solid propellant gas generator and fluid heat exchanger.

It is another object of this invention to provide large amounts of hot gas in a very short period of time by igniting and burning a solid propellant.

It is still another object of the instant invention to heat a liquid propellant quickly by having it absorb heat from the hot gas flow which is generated by the burning of the solid propellant, and to vaporize the liquid, thereby obtaining the desired pressurized gas.

It is yet another object of this invention to deliver the aforesaid pressurized gas to machinery which requires said pressurized gas, such as the turbine of a prepackage liquid engine missile.

It is a further object of the instant invention to direct the hot gas flow generated by the burning of the solid propellant to a machinery capable of utilizing the hot gas flow, such as the nozzle of the liquid engine missile, after the hot gas flow has resulted in heating the liquid propellant and vaporizing it.

These objects of the instant invention, as well as other objects related thereto, will become readily apparent after a consideration of the description of the instant invention, together with reference to the contents of the Figures of the drawing.

DESCRIPTION OF THE DRAWING

FIG. 1 is a side elevation view, in simplified pictorial and schematic form and partially in cross section, of a preferred embodiment of the instant invention; and FIG. 2 is a vertical cross sectional view, in simplified pictorial and schematic form, taken along line 2—2 of FIG. 1.

DESCRIPTION OF THE PREFERRED EMBODIMENT

With reference to FIGS. 1 and 2, therein is shown a preferred embodiment 10 of the instant invention.

For illustrative purposes only, the instant invention 10 is shown in FIG. 1 in a typical working environment, i.e., connected at one end to machinery 100 which requires pressurized gas (such as the turbine of a liquid engine missile); and connected at the other end to a source 200 of liquid 210 (such as a liquid propellant from a turbopump) and to machinery 300 capable of utilizing a hot gas flow (such as the nozzle of a liquid engine missile).

It is emphasized that use of the instant invention 10, as shown in FIG. 1, is not by way of any limitation of the instant invention. In fact, it is fair and accurate to say that the instant invention 10 is useable in any application where a fast, remote start is required for heating a fluid with a very hot gas source.

Still with reference to FIGS. 1 and 2, the instant invention 10, in its most basic and generic structural form, includes a housing 20 having an outlet 22 for connecting the housing to machinery 100 which requires pressurized gas, and inlet 24 for connecting the housing to a source 200 of a liquid 210 (such as a liquid propellant) to be heated, vaporized, and used as the needed pressurized gas. The housing 20 is preferably cylindrical, with the outlet 22 and the inlet 24 at the opposite ends, lengthwise, of the housing 20.

Within the housing 20 a solid propellant 30 is positioned, preferably such that the solid propellant 30 is centrally located, lengthwise. Also as a matter of preference, the solid propellant 30 has a passageway 32 therethrough, with the passageway 32 preferably being centrally located in the solid propellant 30 and extending along the entire length of the propellant 30.

A casing 40 is supported within the housing 20, surrounds the solid propellant 30, and has an open end 42 whereat an end 34 of the solid propellant 30 is exposed. An igniter 52 of a suitable means 50 for igniting, and causing the burning of, the solid propellant 30 is positioned within the housing 20 adjacent to the exposed end 34 of the solid propellant 30. The igniting means 50 also includes a conduit, such as 54, through which the igniter 52 is introduced into the housing 20 and is positioned as hereinbefore described.

A novel means 60 is disposed within the housing 20 and surrounds the casing 40 for defining the flow path of the liquid 210 into, within, and out of the housing 20, and also for directing the liquid flow 210, such that the liquid flow 210, is adjacent to but separated from the hot gas flow 36 generated by the burning of the solid propellant 30.

This liquid flow defining means 60 includes a flow divider 62, best seen in FIG. 2, which is within the housing 20; which abuts the inner surface of the housing 20; and which is positioned around and spaced apart from the external surface of the casing 40, thereby forming a chamber 70 (which preferably is annular) in which flows the hot gas 36 that is generated by the ignition and burning of the solid propellant 30.

It is here to be noted: that the flow divider 62 is not in the hot gas flow 36; that the inner surface of the flow divider 62 and the external surface of the casing 40 define the chamber 70 which defines the hot gas flow path 36; that the flow divider 62 is preferably serrated and finned; and that the flow divider 62 is positioned in, and defines, the flow path of the liquid 210.

As a matter of preference, the instant invention 10 also includes a means 80 for ducting the hot gas flow 36 out of the housing 20 and into machinery 300 capable of utilizing the hot gas flow 36. This means 80 may be in the form of an outlet conduit 82 which interconnects the hot gas flow path 36 with the aforementioned machinery 300. It is to be noted that this "ducted" hot gas 36, is the hot gas which has already heated the liquid 210, and otherwise would be and could be vented outboard and not further utilized.

Also as a matter of preference, the instant invention 10 further includes a means 90 for metering and distributing at a preselected rate of flow the hot gas 36 which is generated by the burning of the solid propellant 30. This means 90 includes a distributor plate 92, best seen in FIG. 2, which is disposed within the flow of the hot gas 36 and which is positioned in the chamber 70 between the external surface of the casing 40 and the internal surface of the liquid flow divider 62.

MANNER OF USE AND OPERATION OF PREFERRED EMBODIMENT

The manner of use, and of operation, of the preferred embodiment 10, FIGS. 1 and 2, of the instant invention can be easily ascertained by any person of ordinary skill in the art, from the foregoing description, coupled with reference to the contents of the Figures of the drawing.

For others, the following explanation is given. The solid propellant 30 is ignited by the igniter 52, and the hot gas 36 which is generated by the burning of the solid propellant 30 is channeled to and through chamber 70 and the distributor plate 92 therein, eventually exiting through outlet conduit 82 and entering, and being used by, machinery 300 capable of utilizing the hot gas flow 36, such as the nozzle of a liquid missile engine.

The liquid propellant 210, which is to be heated, vaporized, and used as pressurized gas, enters the housing 20 through the inlet 24 from the source 200, such as a turbopump of a liquid engine missile. The liquid propellant 210 flows through the serrated, finned, flow divider 62. In the counter flow heat exchange process, the liquid 210 picks up heat from the hot gas 36 generated by the burning of the solid propellant 30 and vaporizes, before exiting through housing outlet 22 as pressurized gas to the machinery 100 which requires pressurized gas, such as the turbine of a liquid engine missile.

CONCLUSION

It is abundantly clear from all of the foregoing, and from the contents of the Figures of the drawing, that the stated objects of the instant invention 10, as well as other objects related thereto, have been achieved.

It is to be noted that, although there have been described and shown the fundamental features of the instant invention, as applied to a preferred embodiment 10 for use in a particular application, nevertheless various other embodiments, variations, substitutions, additions, omissions, and the like may occur to, and can be made by those of ordinary skill in the art.

What is claimed is:

1. An integrated solid propellant gas generator and fluid heat exchanger, comprising:
   a. a housing;
   b. means, within said housing, for encasing a solid propellant therein, wherein this means comprises a casing surrounding said solid propellant, with said casing supported within said housing;
   c. means for igniting and burning said solid propellant, thereby generating a hot flow of gas, wherein this means is operably connected to, and is disposed adjacent to an opening of, said solid propellant encasing means;
   d. means, within said housing, for containing said hot gas flow of said propellant gas and for directing said hot gas flow out of said housing, wherein this means includes:
      a chamber in which flows said hot gas generated by the burning of said solid propellant; and
      means, in communication with said chamber, for ducting said hot gas flow of solid propellant gas out of said housing and into machinery capable of utilizing said hot gas flow;
   e. means for receiving a liquid propellant therein, with said liquid propellant being capable of vaporizing upon absorbing heat from said hot flow of said propellant gas and thereby forming a pressurized gas, wherein this means is disposed within said housing, surrounds said casing, and is located adjacent to said means for containing said said hot flow of solid propellant gas, and wherein said liquid propellant receiving means includes a housing inlet which connects said housing and said liquid propellant receiving means to a source of liquid propellant, and also wherein said liquid propellant receiving means and the external surface of said casing form said chamber in which flows said hot gas generated by the burning of said solid propellant, and further wherein said liquid propellant receiving means defines the flow path of said liquid propellant into, within, and out of said housing, with the flow of said liquid propellant directed by this means such as to be adjacent to and separated from said hot gas flow of burning solid propellant; and
   f. means, operably connected to said liquid propellant receiving means, for allowing said pressurized gas in said liquid propellant receiving means to exit therefrom and from said housing, wherein said means for allowing said pressurized gas to exit includes a housing outlet connected to machinery which requires pressurized gas.

2. An integrated solid propellant gas generator and fluid heat exchanger, as set forth in claim 1, wherein said solid propellant has a length-wise, centrally located, passageway therethrough.

3. An integrated solid propellant gas generator and fluid heat exchanger, as set forth in claim 1, wherein said means for igniting said solid propellant includes a conduit leading from outside of said housing to a location inside of said housing at a position adjacent to said solid propellant at said casing, whereby an igniter is introduced into said housing and is positioned adjacent said solid propellant.

4. An integrated solid propellant gas generator and fluid heat exchanger, as set forth in claim 1, wherein said means for receiving said liquid propellant includes a serrated, finned, flow divider which is disposed around and spaced apart from said casing, and which also is positioned in said flow path of said liquid propellant.

5. An integrated solid propellant gas generator and fluid heat exchanger, as set forth in claim 4, wherein means for metering and distributing, at a preselected rate of flow, said hot gas generated by said burning solid propellant is disposed within said flow of said hot gas and is positioned in said chamber between said casing and said liquid propellant flow divider.

* * * * *